United States Patent
Singh et al.

(10) Patent No.: US 10,247,574 B2
(45) Date of Patent: Apr. 2, 2019

(54) MINIMUM MANEUVERABLE ALTITUDE DETERMINATION AND DISPLAY SYSTEM AND METHOD

(71) Applicant: HONEYWELL INTERNATIONAL INC., Morris Plains, NJ (US)

(72) Inventors: Jaibir Singh, New Delhi (IN); Sreenivasan Govindillam K., Karnataka (IN); Raghu Shamasundar, Karnataka (IN); Abneesh Singla, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 66 days.

(21) Appl. No.: 15/598,433

(22) Filed: May 18, 2017

(65) Prior Publication Data

US 2018/0335315 A1 Nov. 22, 2018

(51) Int. Cl.
*G01C 23/00* (2006.01)
*G08G 5/00* (2006.01)

(52) U.S. Cl.
CPC ......... *G01C 23/005* (2013.01); *G08G 5/0013* (2013.01); *G08G 5/0047* (2013.01); *G08G 5/0086* (2013.01); *G08G 5/0091* (2013.01)

(58) Field of Classification Search
None
See application file for complete search history.

(56) References Cited

U.S. PATENT DOCUMENTS 7,584,046 B2 * 9/2009 Deker .................. G05D 1/0646
                                                         701/120
8,155,803 B2    4/2012 Ferro
9,189,962 B1 * 11/2015 McCusker ............. G01C 21/20
9,199,724 B2   12/2015 Pastor
9,418,561 B2    8/2016 Gannon et al.

(Continued)

FOREIGN PATENT DOCUMENTS

EP       2708852 A1    3/2014
WO    2011078847 A1    6/2011

OTHER PUBLICATIONS

Extended EP Search Report for Application No. 18171721.6 dated Oct. 16, 2018.

*Primary Examiner* — Lail A Kleinman
(74) *Attorney, Agent, or Firm* — Lorenz & Kopf, LLP

(57) ABSTRACT

A system and method for determining and displaying a minimum maneuverable altitude for an aircraft to turn back includes automatically processing aircraft characteristic data, aircraft flight trajectory data, and environmental/airport services data, in a processing system, to determine a rate of change of aircraft maneuverable altitude with respect to change in aircraft heading. At least the determined rate of change of aircraft altitude with respect to change in aircraft heading is processed, in the processing system, to determine the minimum maneuverable altitude at least engine out conditions. Terrain data is processed, in the processing system, to determine a terrain clearance height above which the minimum maneuverable altitude may be implemented. The minimum maneuverable altitude is rendered, on a display device, on the altitude tape, and a pseudo gate is rendered on the display device that represents a height above the terrain that corresponds to the minimum maneuverable altitude.

20 Claims, 5 Drawing Sheets

(56) References Cited

U.S. PATENT DOCUMENTS

| | | |
|---|---|---|
| 9,520,066 B2 | 12/2016 | Spinelli et al. |
| 9,583,010 B1 | 2/2017 | Kolek |
| 2007/0088492 A1 | 4/2007 | Bitar |
| 2008/0243315 A1 | 10/2008 | Ferro |
| 2010/0100261 A1* | 4/2010 | Botargues ............... G01C 5/005 701/6 |
| 2017/0132939 A1 | 5/2017 | Prenot |

* cited by examiner

MINIMUM MANEUVERABLE ALTITUDE DETERMINATION AND DISPLAY SYSTEM AND METHOD

TECHNICAL FIELD

The present invention generally relates to minimum maneuverable altitude, and more particularly relates to a system and method for determining and displaying a minimum maneuverable altitude.

BACKGROUND

Though highly unlikely, it is postulated that certain emergency events, such as, for example, a single or dual engine out condition, could occur during aircraft takeoff. If such an unlikely (yet postulated) event was to occur, the flight crew is faced with two options: (1) conduct a forward landing or (2) return to the takeoff runway. Each of these options has its benefits and detriments.

A forward landing is an off-runway landing. This option, when exercised, requires relatively less maneuvering by the flight crew. However, this option may result in landing in an undesirable location, such as a populated area or on rough terrain. Moreover, in some locations the terrain characteristics are not amenable to a forward landing The option of returning to the takeoff runway is the more desirable of the two options. This is due, at least in part, to facility familiarity, paved runways, and the availability of emergency facilities. However, before exercising this option the flight crew would need to process, relatively quickly, significant amounts of information. For example, the flight crew would need to at least determine the altitude loss associated with the return, determine the minimum maneuverable altitude to implement the return under current aircraft conditions, determine whether surrounding terrain may present an issue, and assess the runway/airport conditions.

To determine the minimum maneuverable altitude, the flight crew will need to account for numerous parameters such as, for example, climb rates and/or descent rates, glide rates, and environmental conditions, such as wind and visibility, just to name a few. The flight crew will also need to account for airframe-specific characteristics, such as weight, wingspan, the number and health status of the engines, and drag, just to name a few. Moreover, it is further recommended that the flight crew add an additional altitude safety margin of 20%. As may be appreciated, non-desirable outcomes, such as an early or late turn, a turn at insufficient altitude, or a turn in the wrong direction, may occur if such information is inaccurate or is unavailable to the flight crew.

Hence, there is a need for a system and method for determining and displaying to a flight crew the minimum maneuverable altitude for an aircraft to turn back, which does not rely on the flight crew accounting for various parameters and/or airframe-specific characteristics. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for determining and displaying a minimum maneuverable altitude for an aircraft to turn back includes automatically processing aircraft characteristic data, aircraft flight trajectory data, and environmental/airport services data, in a processing system, to determine a rate of change of aircraft maneuverable altitude with respect to change in aircraft heading. At least the determined rate of change of aircraft altitude with respect to change in aircraft heading is processed, in the processing system, to determine the minimum maneuverable altitude at least engine out conditions. Terrain data is processed, in the processing system, to determine a terrain clearance height above which the minimum maneuverable altitude may be implemented. The minimum maneuverable altitude is rendered, on a display device, on the altitude tape, and a pseudo gate is rendered on the display device that represents a height above the terrain that corresponds to the minimum maneuverable altitude.

In another embodiment, a system for determining and displaying a minimum maneuverable altitude for an aircraft to turn back includes a display device, a terrain data source, an aircraft characteristic data source, an aircraft flight trajectory data source, an environmental/airport services data source, and a processing system. The display device is responsive to image rendering display commands to render one or more images. The terrain data source is configured to supply terrain data. The aircraft characteristic data source is configured to supply data indicative of a plurality of physical characteristics of the aircraft. The aircraft flight trajectory data source is configured to supply information indicative of current aircraft flight trajectory. The environmental/airport services data source is configured to supply information indicative of a plurality of environmental/airport services conditions external to the aircraft. The processing system is in operable communication with the display device, the terrain data source, the aircraft characteristic data source, the aircraft flight trajectory data source, and the environmental/airport services data source. The processing system configured to receive and process the data from each of these data sources to thereby: determine a rate of change of aircraft maneuverable altitude with respect to change in aircraft heading, determine the minimum maneuverable altitude at least or engine out conditions, determine a terrain clearance height above which the minimum maneuverable altitude may be implemented, and supply image rendering display commands to the display device that cause the display device to render at least: an altitude tape, terrain, the minimum maneuverable altitude on the altitude tape, and a pseudo gate that represents a height above the terrain that corresponds to the minimum maneuverable altitude.

Furthermore, other desirable features and characteristics of the minimum maneuverable altitude determination and display system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
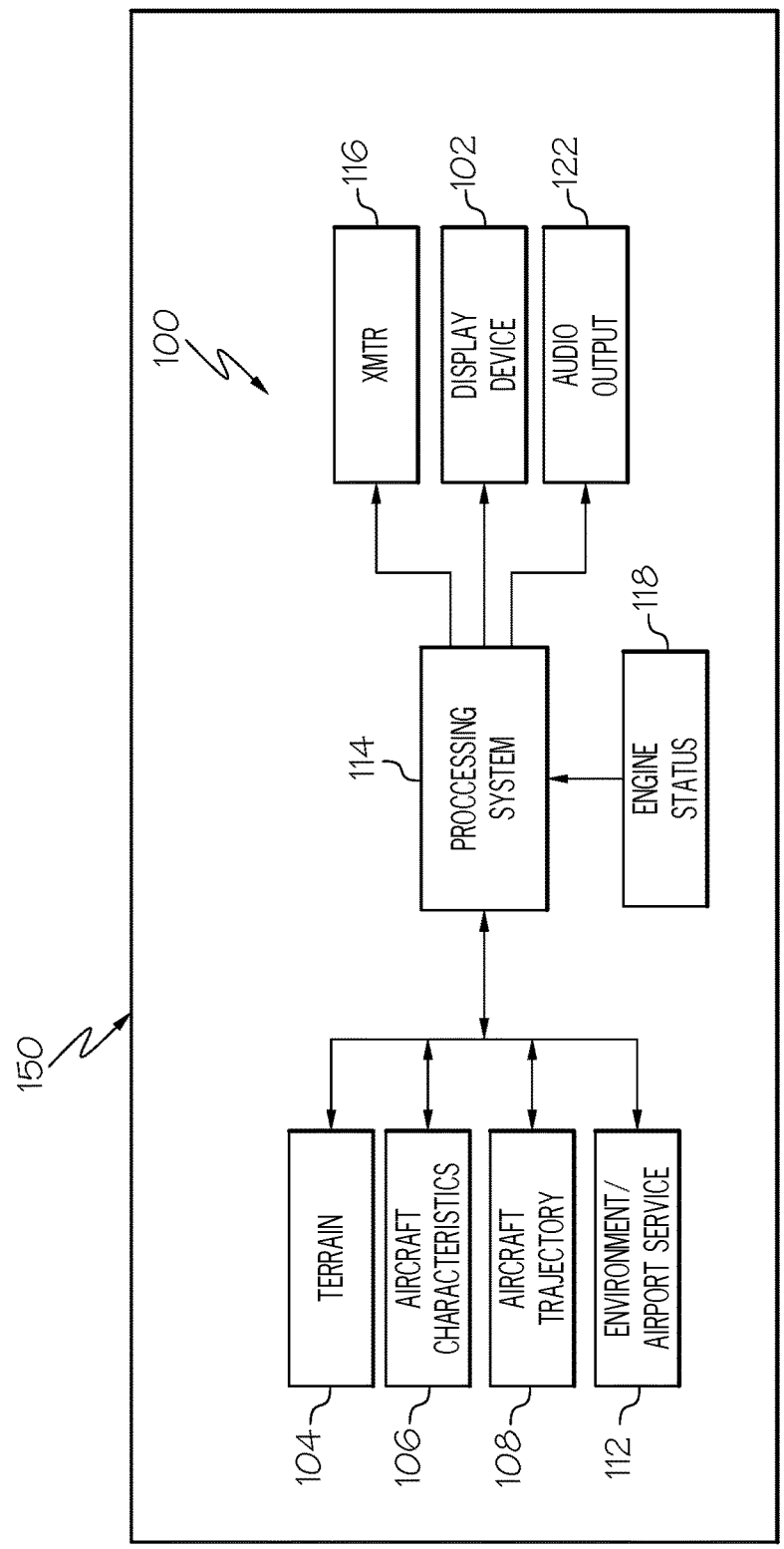
FIG. 1 depicts a functional block diagram of one embodiment of a minimum maneuverable altitude determination and display system.

Referring to FIG. 1, a functional block diagram of one embodiment of a minimum maneuverable altitude determination and display system 100 is depicted. The depicted system 100 includes a display device 102, a terrain data source 104, an aircraft characteristic data source 106, an aircraft flight trajectory source 108, an environmental/airport services data source 112, and a processing system 114, all or portions of which are disposed within an aircraft 150. Before proceeding further, it is noted that although the data sources 104-112 are depicted using separate functional blocks, this is done merely for clarity and ease of depiction and description. It will be appreciated that one or more of the data sources 104-112 could be implemented as part of the same system or sub-system, and that one or more of the data sources 104-112 could also comprise a plurality of systems or sub-systems that are not separately described herein.

Continuing now with the description, the display device 102 is responsive to image rendering display commands to render one or more images. Some embodiments of the images rendered by the display device 102 are described in more detail further below. It will be appreciated that the display device 102 may be implemented using any one of numerous types of display devices. For example, it may be implemented using a cathode ray tube (CRT), a light-emitting diode (LED) display, an electroluminescent display (ELD), a plasma display panel (PDP), a liquid crystal display (LCD), or an organic LED (OLED) display, just to name a few. The display device 102 may also be configured to implement any one of numerous display functions. For example, it may be configured to implement a multi-function display (MFD), a primary flight display (PFD), or an engine indicating and crew alerting system (EICAS) display, just to name a few. In one particular embodiment, the display device 102 is implemented using a graphical display, and implements a synthetic vision system PFD.

The terrain data source 104 is configured to supply terrain data. The terrain data includes, for example, various types of data representative of the terrain over which the aircraft 150 is, has, or will be flying. As such, the terrain data may include the locations and elevations of natural terrain obstacles, such as mountains or other elevated ground areas, and also the locations and elevations of man-made obstacles such as radio antenna towers, buildings, bridges, etc. The terrain data may also include, for example, the boundaries of restricted airspace, restricted elevations for particular airspace, bodies of water, etc. The terrain data may also include airport and runway location and characteristic data. It will also be appreciated that some terrain data, such as airport and runway location and characteristic data, may be supplied from one or more other data sources such as, for example, an onboard flight management system database, an onboard navigation database, an onboard sensor or radar devices, or an external database.

The aircraft characteristic data source 106 is configured to supply data indicative of a plurality of physical characteristics of the aircraft 150. The physical characteristics may vary and may include, for example, aircraft weight, aircraft wingspan, aircraft length, the number and health status of the engines, just to name a few.

The aircraft flight trajectory data source 108 is configured to supply information indicative of the current aircraft flight trajectory. The aircraft flight trajectory data source 108 may be implemented using one or more sensors, such as one or more inertial sensors, or it may be implemented using an aircraft flight management system (FMS). As may be appreciated, the aircraft flight trajectory includes at least aircraft heading, aircraft altitude, aircraft speed, aircraft yaw angle, aircraft roll angle, and stall speed, just to name a few.

The environmental/airport services data source 112 is configured to supply information indicative of a plurality of environmental conditions external to the aircraft 150, and indicative of airport conditions. The environmental conditions may vary, and may include, for example, wind speed, wind direction, outside air temperature, and atmospheric pressure, just to name a few. The airport conditions may also vary, and may include, for example, runway conditions, ground visibility, just to name a few. Although depicted in FIG. 1 using a single functional block, it will be appreciated that the environmental/airport services data source 112 may be implemented using one or a plurality of systems or sub-systems. For example, the environmental data may be variously supplied from one or more on-board sensors, the aviation weather center (AWC), the automatic terminal information service (ATIS), terminal weather information for pilots (TWIP), notice to airmen (NOTAM), just to name a few.

Regardless of how each of the data sources 104-112 is implemented, the processing system 114 is in operable communication with the data sources 104-112 and the display device 102. The processing system 114 is configured to receive and process the data supplied from each of these data sources 104-112. The processing implemented in the processing system 114 results in the determination and display, on the display device 102, of at least the minimum maneuverable altitude (MMA). That is, the minimum altitude that will support returning to, and landing on, the takeoff runway. This will allow the flight crew to quickly assess whether to exercise the return to takeoff runway option.

It will be appreciated that the processing system 114 may be configured to determine the minimum maneuvering altitude (MMA) using any one of numerous techniques. In one particular embodiment, however, the processing system 114 makes this determination by first determining the rate of change of the aircraft maneuverable altitude (h) with respect to the change in aircraft heading ($\Psi$) (e.g., $dh/d\Psi$), and then determining the MMA. Although the processing system 114 may be configured to determine the rate of change of aircraft maneuverable altitude with respect to change in aircraft heading ($dh/d\Psi$) using any one of numerous techniques, in one particular embodiment, the processing system 114 makes this determination using the following equation:

$$dh/d\Psi = (Cd*4W)/(Cl*Cl*\rho*S*g*\sin 2\Phi),$$

where:
Ψ=aircraft yaw angle;
Φ=aircraft roll angle;
S=aircraft wing span area;
W=aircraft weight;
g=gravitational constant;
Cl=coefficient of lift; and
Cd=coefficient of drag.

The processing system 114 then uses the following equation to determine the MMA:

$$MMA = (dh/d\Psi) \text{ for a } 180° \text{ turn} + MTE + MSA + 20\%,$$

where:
MTE=maximum terrain elevation determined from the terrain database, and
MSA=minimum safe altitude from a visual flight rules (VFR) chart.

Figure 2:
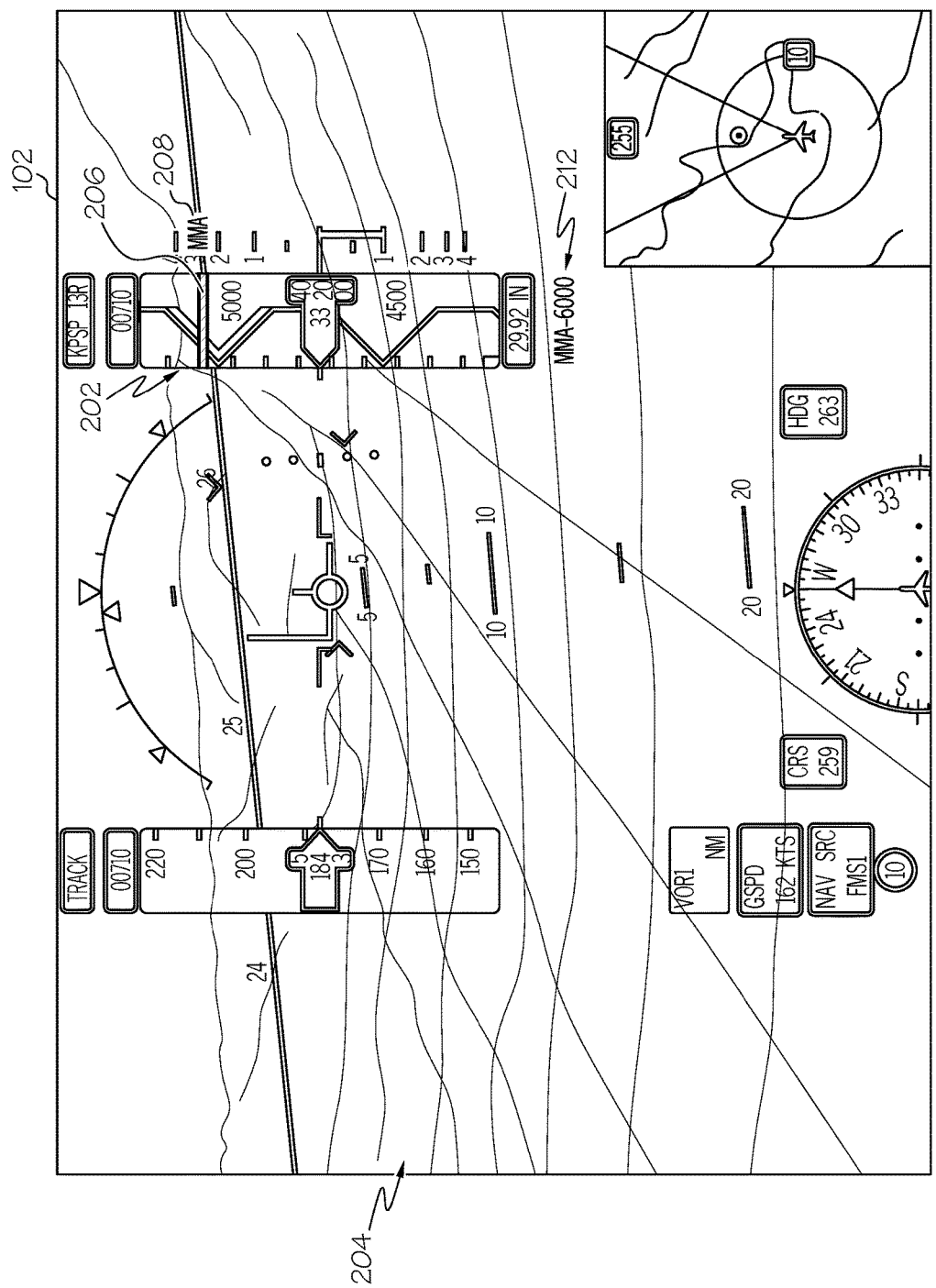
FIGS. 2-4 each depict an embodiment of an example image that may be rendered by a display device that forms part of the system of FIG. 1.

The processing system 114 is additionally configured to supply image rendering display commands to the display device 102. As noted above, the display device 102 is responsive to these command to render various images. It will be appreciated that the specific images, symbology, and the positions thereof may vary. In one embodiment, which is depicted in FIG. 2, the image rendering display commands supplied by the processing system 114 cause the display device 102 to display at least an altitude tape 202, terrain 204, and the minimum maneuverable altitude 206 on the altitude tape 202. In the depicted embodiment, the minimum maneuverable altitude 206 is displayed as at least a colored line at the corresponding altitude on the altitude tape 202. As FIG. 2 further depicts, the processing system 114 may also, in some embodiments, command the display device 102 to render text 208 (e.g., "MMA") next to the colored line to clarify that the line corresponds to the minimum maneuverable altitude, and text 212 (e.g., "MMA—6000) that even more clearly specifies the minimum maneuverable altitude value.

Figure 3:
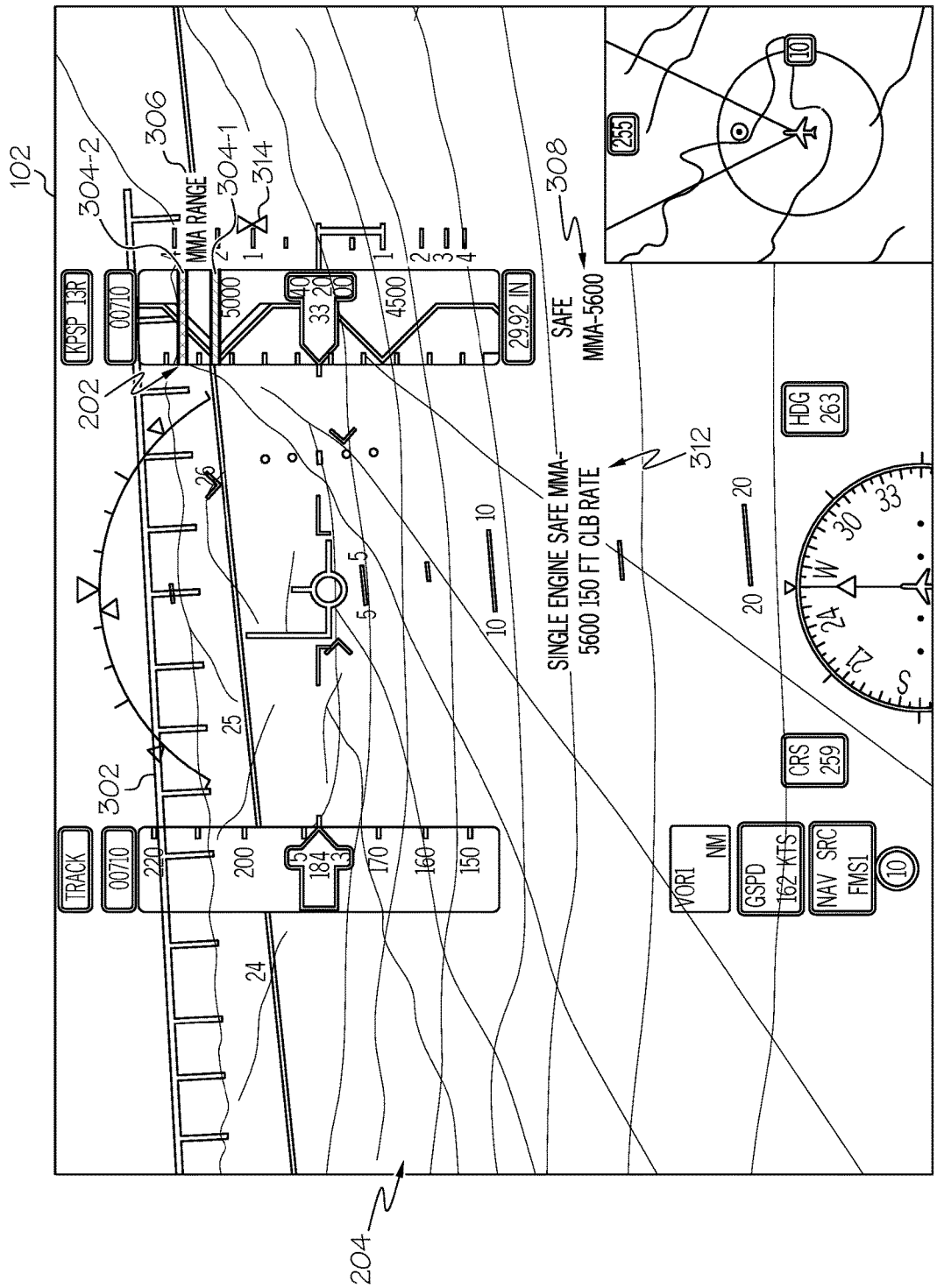

In addition to determining and displaying the minimum maneuverable altitude, the processing implemented in the processing system 114 may also result in a determination of the terrain clearance height above which the minimum maneuverable altitude may be implemented. As depicted in FIG. 3, the processing system 114, upon making this determination, may also command the display device 102 to render what is referred to herein as a pseudo gate 302. The pseudo gate 302, when rendered represents the height above the terrain 204 that corresponds to the minimum maneuverable altitude. This provides an additional visual cue to the flight crew that clearly indicates the height above the terrain 204 (i.e., the terrain clearance height) that the aircraft needs to attain before implementing the return to takeoff runway option.

As may be appreciated to those skilled in the art, the minimum maneuverable altitude may encompass a range of altitudes. This range of altitudes, which is referred to herein as the minimum maneuverable altitude range, represents a range of altitudes within which the return to takeoff runway option may be implemented. Thus, the processing system 114 may also, in some embodiments, be configured to determine the minimum maneuverable altitude range, and supply image rendering display commands to the display device 102 that cause the display device 102 to render the minimum maneuverable altitude range. The manner in which the minimum maneuverable altitude range is rendered on the display device 102 may vary. For example, in the embodiment depicted in FIG. 3, the minimum maneuverable altitude range is rendered on the altitude tape 202 using two lines 304—a first line 304-1 and a second line 304-2—that may be rendered using different colors. In the depicted embodiment, the first line 304-1 is rendered in a first color (e.g., green) at a first altitude (e.g., a minimum altitude) on the altitude tape 202, and the second line 304-2 is rendered in a second color (e.g., red) at a second, higher altitude (e.g., a maximum altitude) on the altitude tape 202. This means that the minimum maneuverable altitude range is between the first altitude (e.g., 5600 feet) and the second altitude (e.g., 5900 feet), and informs the flight crew that they will, if necessary, need to implement the return to takeoff runway option after reaching the first altitude, and that they should not exceed the second altitude.

As FIG. 3 further depicts, the processing system 114 may also, in some embodiments, command the display device 102 to render text 306 (e.g., "MMA RANGE") next to the colored lines to clarify that the lines correspond to the minimum maneuverable altitude range. The processing system 114 may also, in some embodiments, command the display device 102 to render text 308 (e.g., "SAFE MMA—5600) that even more clearly specifies the minimum altitude value associated with the minimum maneuverable altitude range. In addition, the processing system 114 may also, in some embodiments, command the display device 102 to render text 312 (e.g., "SINGLE ENGINE SAFE MMA—5600 WITH 150 FT CLIMB RATE) that indicates the minimum altitude value is for a single engine out event, and that the flight crew will need to climb, at a rate of 150 feet/second, to attain the minimum maneuverable altitude.

In some embodiments, the minimum maneuverable altitude range may include more than two altitude values. For example, in the embodiment depicted in FIG. 4 the minimum maneuverable altitude range includes three altitude values, and the minimum maneuverable altitude range is rendered on the altitude tape 202 using three lines 402—a first line 402-1, a second line 402-2, and a third line 402-3—using three different colors. In the depicted embodiment, the first line 402-1 is rendered in a first color (e.g., green) at a first altitude on the altitude tape 202, the second line 402-2 is rendered in a second color (e.g., yellow) at a second, lower altitude on the altitude tape 202, and the third line 402-3 is rendered in a third color (e.g., red) at a third, even lower altitude on the altitude tape 202. In this instance, this not only indicates that the minimum maneuverable altitude range is between the first altitude (e.g., 4200 feet) and the third altitude (e.g., 3800 feet), it also indicates that the second altitude, which slightly less than first altitude, is an acceptable altitude from which to implement the return to takeoff runway option, but that it should be implemented with caution. The third line 402-3 indicates that the third altitude is not an acceptable (or advisable) altitude from which to implement the return to takeoff runway option.

Figure 4:
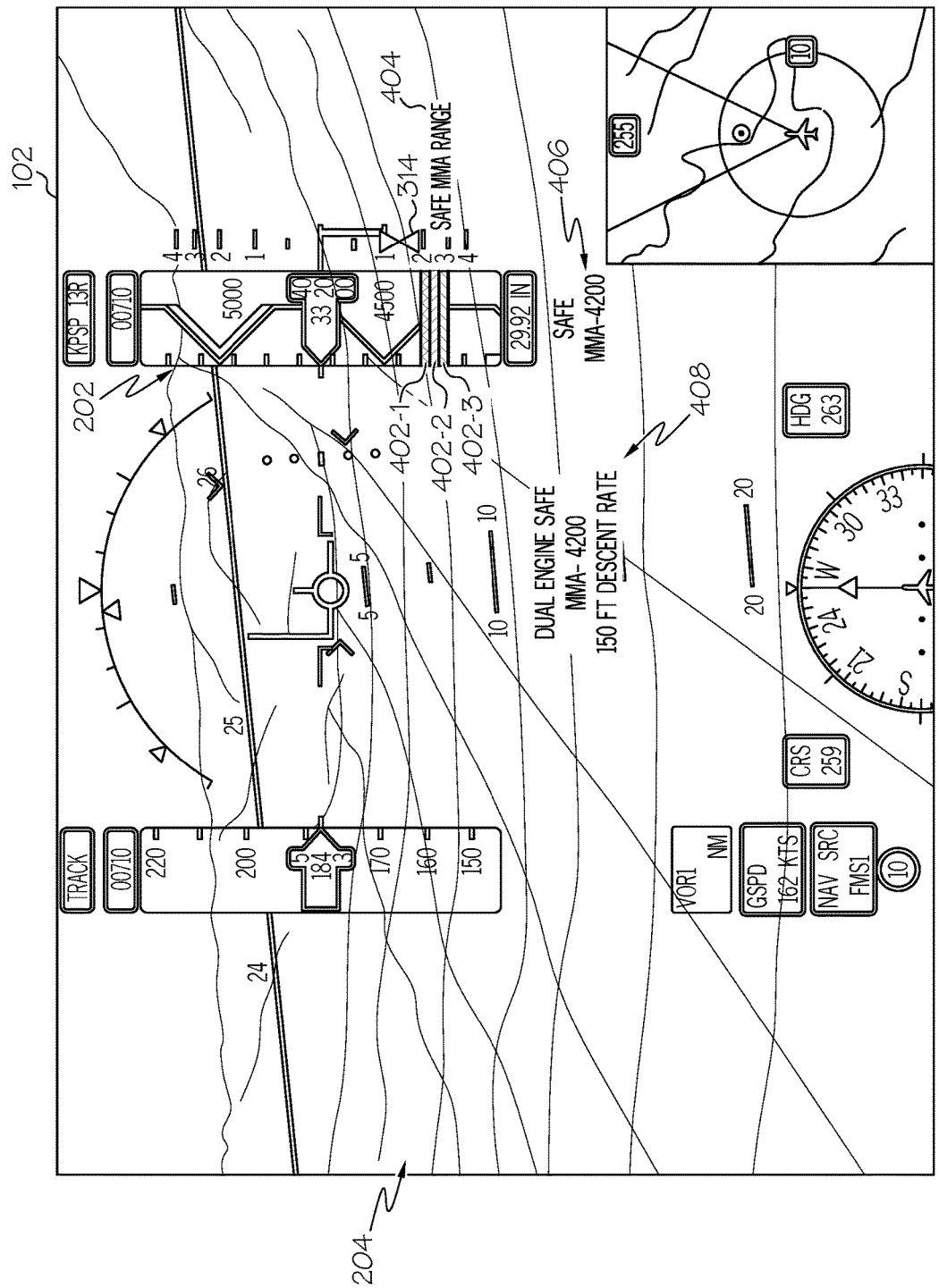

Still referring to FIG. 4, it is seen that, like the embodiment of FIG. 3, the processing system 114 may also, in some embodiments, command the display device 102 to render text 404 (e.g., "MMA RANGE") next to the colored lines to clarify that the lines correspond to the minimum maneuverable altitude range. The processing system 114 may also, in some embodiments, command the display device 102 to render text 406 (e.g., "SAFE MMA—4200) that even more clearly specifies the minimum altitude associated with the minimum maneuverable altitude range. In addition, the processing system 114 may also, in some embodiments, command the display device 102 to render text 408 (e.g., "DUAL ENGINE SAFE MMA—4200 WITH 150 FT DESCENT RATE) that indicates the minimum altitude value is, at least in the depicted example, for a dual engine out event, and that the flight crew will need to descend, at a rate of 150 feet/second, to the minimum maneuverable altitude.

Because, as was just noted, the flight crew may, in some instances, need to ascend or descend to the minimum maneuverable altitude, the processing system 114 may also be configured to determine the required climb rate or the required descent rate to attain the minimum maneuverable altitude (or minimum maneuverable altitude range). In such embodiments, the processing system 114, upon making this determination, may also supply image rendering display commands to the display device 102 that cause the display device 102 to render the required climb rate or descent rate, not just textually, by symbolically. More specifically, the processing system 114 commands the display device 102 to render the required climb rate when the minimum maneuverable altitude is above current aircraft altitude, and to render the required descent rate when the minimum maneuverable altitude is below current aircraft altitude. The manner in which the required climb rate or descent rate is rendered on the display device 102 may vary. For example, in the embodiments depicted in FIGS. 3 and 4, the climb rate (FIG. 3) or descent rate (FIG. 4) is additionally rendered using a symbol 314.

An additional feature that may be implemented by the system 100 is automatic transmission of the minimum maneuverable altitude (or minimum maneuverable altitude range) to, for example, an air traffic control tower at the originating airport. This will ensure that air traffic control clears the airway and runway for the aircraft return to the takeoff runway. In this regard, and with reference once again to FIG. 1, the system 100 may additionally include a transmitter 116. The transmitter 116, when included, is coupled to the processing system 114 and receives a transmission command signal from the processing system 114. The transmitter 116 is configured, upon receipt of the transmission command signal, to automatically transmit the minimum maneuverable altitude to, for example, the air traffic control tower.

The system 100 may be configured to determine and display the minimum maneuverable altitude during both normal engine conditions and engine out conditions, or during only engine out conditions (single or dual). Thus, as FIG. 1 also depicts, the processing system 100 may, in some embodiments, also be coupled to receive engine status signals 118 to indicate the operational (or non-operational) status of the engine(s). The system 100 may also, in some embodiments, be equipped with one or more audio output devices 122 that are configured, in response to commands from the processing system 114, to generate audio output cues representative of one or more of the minimum maneuverable altitude, the climb rate, and/or the descent rate.

Figure 5:
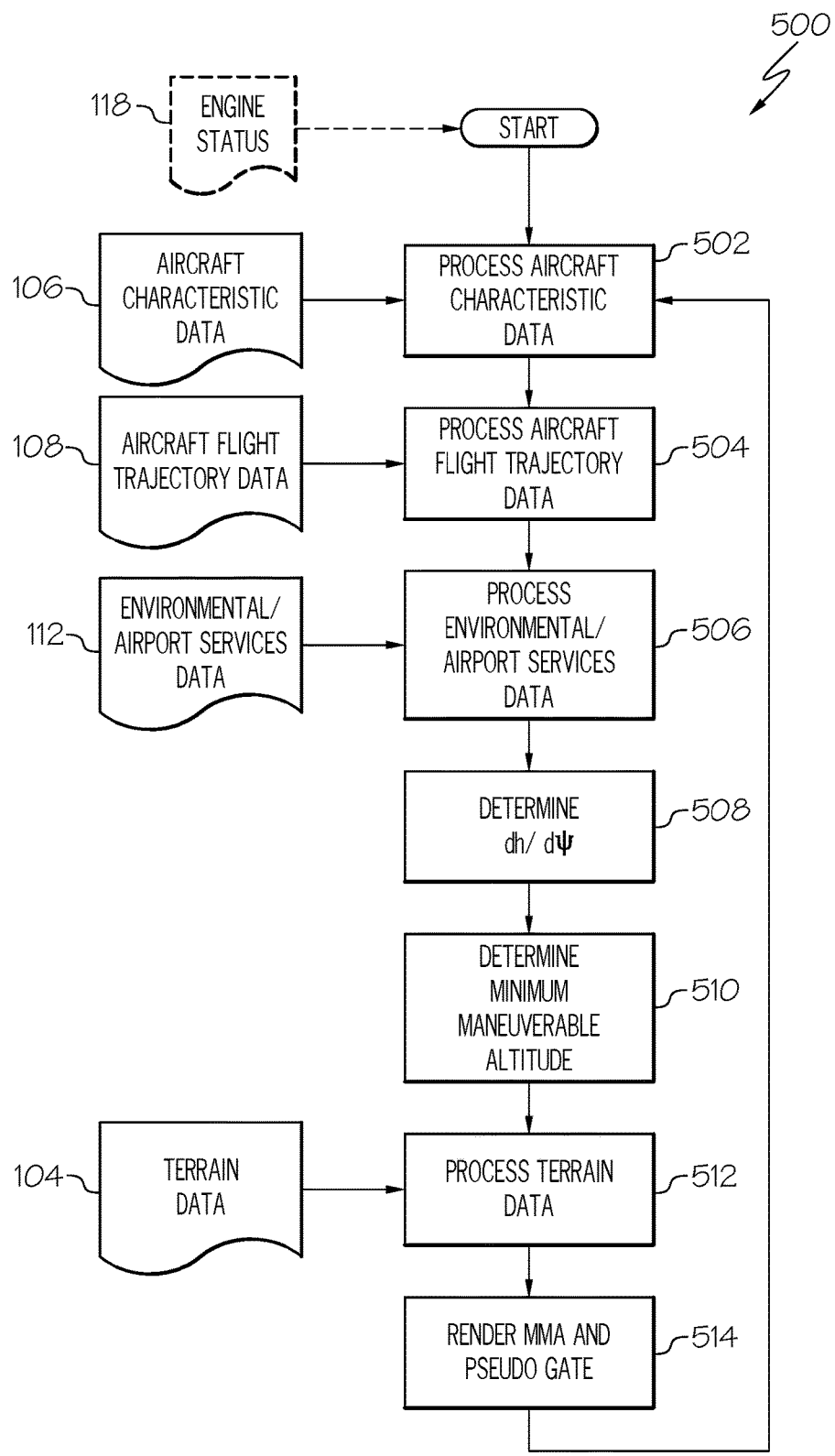
FIG. 5 depicts a process, in flowchart form, that may be implemented by the system of FIG. 1 for determining the minimum maneuverable altitude for an aircraft.

One embodiment of a process for determining and displaying the minimum maneuverable altitude for an aircraft to turn back, and that may be implemented by the system of FIG. 1, is depicted in flowchart form in FIG. 5. For completeness, this process 500 will now be described. Before doing so, it will be appreciated that the process 500 may be initiated upon system startup, and continuously run, regardless of engine status, or as FIG. 5 depicts in phantom, it may be initiated only upon a determination, via the engine status signal 118, that an engine out condition (single or dual) exists.

Regardless of what the initiation event is, the processing system 114, upon initiation of the process 500, automatically processes aircraft characteristic data (502), aircraft flight trajectory data (504), and environmental/airport services data (506) to determine the rate of change of aircraft maneuverable altitude with respect to the change in aircraft heading (e.g., $dh/d\Psi$) (508). The determined rate of change of aircraft maneuverable altitude with respect to change in aircraft heading is then processed to determine the minimum maneuverable altitude in at least engine out conditions (510). Terrain data is also processed to determine a terrain clearance height above which the minimum maneuverable altitude may be implemented (512). Thereafter, the display device 102 renders the minimum maneuverable altitude on the altitude tape 202 and the pseudo gate on the terrain 204 (514).

The system and method described herein determines and displays the minimum maneuverable altitude for an aircraft to turn back, without requiring the flight crew to account for various parameters and/or airframe-specific characteristics.

In one embodiment, a method for determining and displaying a minimum maneuverable altitude for an aircraft to turn back includes automatically processing aircraft characteristic data, aircraft flight trajectory data, and environmental/airport services data, in a processing system, to determine a rate of change of aircraft maneuverable altitude with respect to change in aircraft heading. At least the determined rate of change of aircraft altitude with respect to change in aircraft heading is processed, in the processing system, to determine the minimum maneuverable altitude at least engine out conditions. Terrain data is processed, in the processing system, to determine a terrain clearance height above which the minimum maneuverable altitude may be implemented. The minimum maneuverable altitude is rendered, on a display device, on the altitude tape, and a pseudo gate is rendered on the display device that represents a height above the terrain that corresponds to the minimum maneuverable altitude.

These aspects and other embodiments may include one or more of the following features. Automatically transmitting, via a transmitter, the minimum maneuverable altitude to an air traffic control tower. The aircraft characteristic data, the aircraft flight trajectory data, the airport data, and the environmental/airport services data may be processed, in the processing system, to determine a required climb rate or descent rate, and the required climb rate or descent rate may be rendered on the display device. The required climb rate may be rendered when the minimum maneuverable altitude is above current aircraft altitude, and the required descent rate may be rendered when the minimum maneuverable altitude is below current aircraft altitude. At least the determined rate of change of aircraft altitude with respect to change in aircraft heading may be processed, in the processing system, to determine a minimum maneuverable altitude range. The minimum maneuverable altitude range may be rendered on the altitude tape. The minimum maneuverable altitude range may include a minimum altitude value and a maximum altitude value, and the minimum altitude value and the maximum altitude value may each be rendered in different colors on the altitude tape. The minimum maneuverable altitude range may include at least three altitude values, and each of the three altitude values may be rendered in a different color on the altitude tape.

In another embodiment, a system for determining and displaying a minimum maneuverable altitude for an aircraft to turn back includes a display device, a terrain data source, an aircraft characteristic data source, an aircraft flight trajectory data source, an environmental/airport services data source, and a processing system. The display device is responsive to image rendering display commands to render one or more images. The terrain data source is configured to supply terrain data. The aircraft characteristic data source is configured to supply data indicative of a plurality of physical characteristics of the aircraft. The aircraft flight trajectory data source is configured to supply information indicative of current aircraft flight trajectory. The environmental/airport services data source is configured to supply information indicative of a plurality of environmental/airport services conditions external to the aircraft. The processing system is in operable communication with the display device, the terrain data source, the aircraft characteristic data source, the aircraft flight trajectory data source, and the environmental/airport services data source. The processing system configured to receive and process the data from each of these data sources to thereby: determine a rate of change of aircraft maneuverable altitude with respect to change in aircraft heading, determine the minimum maneuverable altitude at least or engine out conditions, determine a terrain clearance height above which the minimum maneuverable altitude may be implemented, and supply image rendering display commands to the display device that cause the display device to render at least: an altitude tape, terrain, the minimum maneuverable altitude on the altitude tape, and a pseudo gate that represents a height above the terrain that corresponds to the minimum maneuverable altitude.

These aspects and other embodiments may include one or more of the following features. A transmitter coupled to the processing system and configured to automatically transmit the minimum maneuverable altitude to an air traffic control tower. The processing system may be further configured to (i) determine a required climb rate or descent rate, and (ii) supply image rendering display commands to the display device that cause the display device to render the required climb rate or descent rate. The processing system may command the display device to render the required climb rate when the minimum maneuverable altitude is above current aircraft altitude, and command the display device to render the required descent rate when the minimum maneuverable altitude is below current aircraft altitude. The processing system may be further configured to process at least the determined rate of change of aircraft altitude with respect to change in aircraft heading to determine a minimum maneuverable altitude range. The processing system may be further configured to supply image rendering display commands to the display device that cause the display device to render the minimum maneuverable altitude range on the altitude tape. The minimum maneuverable altitude range may include a minimum altitude value and a maximum altitude value, the minimum altitude value and the maximum altitude value may each be rendered in different colors on the altitude tape. The minimum maneuverable altitude range may include at least three altitude values, and each of the at least three altitude values may be rendered in a different color on the altitude tape.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for determining and displaying a minimum maneuverable altitude for an aircraft to turn back, the method comprising the steps of:
automatically processing aircraft characteristic data, aircraft flight trajectory data, and environmental/airport services data, in a processing system, to determine a rate of change of aircraft maneuverable altitude with respect to change in aircraft heading;
processing at least the determined rate of change of aircraft maneuverable altitude with respect to change in aircraft heading, in the processing system, to determine the minimum maneuverable altitude in at least engine out conditions;
processing terrain data, in the processing system, to determine a terrain clearance height above which the minimum maneuverable altitude may be implemented; and
rendering, on a display device that is displaying an altitude tape and terrain, the minimum maneuverable altitude on the altitude tape and a pseudo gate that represents a height above the terrain that corresponds to the minimum maneuverable altitude.

2. The method of claim 1, further comprising:
automatically transmitting, via a transmitter, the minimum maneuverable altitude to an air traffic control tower.

3. The method of claim 1, further comprising:
processing the aircraft characteristic data, the aircraft flight trajectory data, the airport data and the environmental/airport services data, in the processing system, to determine a required climb rate or descent rate; and
rendering, on the display device, the required climb rate or descent rate.

4. The method of claim 3, wherein:
the required climb rate is rendered when the minimum maneuverable altitude is above current aircraft altitude; and
the required descent rate is rendered when the minimum maneuverable altitude is below current aircraft altitude.

5. The method of claim 1, further comprising:
processing at least the determined rate of change of aircraft maneuverable altitude with respect to change in aircraft heading, in the processing system, to determine a minimum maneuverable altitude range.

6. The method of claim 5, further comprising:
rendering, on the display device that is displaying the altitude tape and the terrain, the minimum maneuverable altitude range on the altitude tape.

7. The method of claim 6, wherein:
the minimum maneuverable altitude range comprises a minimum altitude value and a maximum altitude value; and
the minimum altitude value and the maximum altitude value are each rendered in different colors on the altitude tape.

8. The method of claim 6, wherein:
the minimum maneuverable altitude range comprises at least three altitude values; and
each of the three altitude values is rendered in a different color on the altitude tape.

9. The method of claim 1, wherein the rate of change of aircraft maneuverable altitude with respect to change in aircraft heading ($dh/d\Psi$) is determined by:

$$dh/d\Psi = (Cd*4W)/(Cl*Cl*\rho*S*g*\sin 2\varphi)$$

where:
$\Psi$ = aircraft yaw angle;
$\Phi$ = aircraft roll angle;
S = aircraft wing span area;
W = aircraft weight;
g = gravitational constant;
Cl = coefficient of lift;
Cd = coefficient of drag.

10. The method of claim 9, wherein the minimum maneuverable altitude (MMA) is determined by:

$$MMA = (dh/d\Psi) \text{ for a } 180° \text{ turn} + MTE + MSA + 20\%,$$

where:
MTE=maximum terrain elevation determined from the terrain database, and
MSA=minimum safe altitude determined from a visual flight rules (VFR) chart.

11. A system for determining and displaying a minimum maneuverable altitude for an aircraft to turn back, comprising:
a display device responsive to image rendering display commands to render one or more images;
a terrain data source configured to supply terrain data;
an aircraft characteristic data source configured to supply data indicative of a plurality of physical characteristics of the aircraft;
an aircraft flight trajectory data source configured to supply information indicative of current aircraft flight trajectory;
an environmental/airport services data source configured to supply information indicative of a plurality of environmental/airport services conditions external to the aircraft; and
a processing system in operable communication with the display device, the terrain data source, the aircraft characteristic data source, the aircraft flight trajectory data source, and the environmental/airport services data source, the processing system configured to receive and process data from each of these data sources to thereby:
determine a rate of change of aircraft maneuverable altitude with respect to change in aircraft heading, to determine the minimum maneuverable altitude in at least engine out conditions,
determine a terrain clearance height above which the minimum maneuverable altitude may be implemented, and
supply image rendering display commands to the display device that cause the display device to render at least: an altitude tape, terrain, the minimum maneuverable altitude on the altitude tape, and a pseudo gate that represents a height above the terrain that corresponds to the minimum maneuverable altitude.

12. The system of claim 1, further comprising:
a transmitter coupled to the processing system and configured to automatically transmit the minimum maneuverable altitude to an air traffic control tower.

13. The system of claim 1, wherein the processing system is further configured to (i) determine a required climb rate or descent rate, and (ii) supply image rendering display commands to the display device that cause the display device to render the required climb rate or descent rate.

14. The system of claim 13, wherein:
the processing system commands the display device to render the required climb rate when the minimum maneuverable altitude is above current aircraft altitude; and
the processing system commands the display device to render the required descent rate when the minimum maneuverable altitude is below current aircraft altitude.

15. The system of claim 11, wherein the processing system is further configured to process at least the determined rate of change of aircraft maneuverable altitude with respect to change in aircraft heading to determine a minimum maneuverable altitude range.

16. The system of claim 15, wherein the processing system is further configured to supply image rendering display commands to the display device that cause the display device to render the minimum maneuverable altitude range on the altitude tape.

17. The system of claim 16, wherein:
the minimum maneuverable altitude range comprises a minimum altitude value and a maximum altitude value; and
the minimum altitude value and the maximum altitude value are each rendered in different colors on the altitude tape.

18. The system of claim 16, wherein:
the minimum maneuverable altitude range comprises at least three altitude values; and
each of the at least three altitude values is rendered in a different color on the altitude tape.

19. The system of claim 11, wherein the processing system determines the rate of change of aircraft maneuverable altitude with respect to change in aircraft heading ($dh/d\Psi$) by:

$$dh/d\Psi = (Cd*4W)/(Cl*Cl*\rho*S*g*\sin 2\varphi),$$

where:
$\Psi$=aircraft yaw angle;
$\Phi$=aircraft roll angle;
S=aircraft wing span area;
W=aircraft weight;
g=gravitational constant;
Cl=coefficient of lift;
Cd=coefficient of drag.

20. The system of claim 19, wherein the processing system determines the minimum maneuverable altitude (MMA) by:

$$MMA = (dh/d\Psi) \text{ for a } 180° \text{ turn} + MTE + MSA + 20\%,$$

where:
MTE=maximum terrain elevation determined from the terrain database, and
MSA=minimum safe altitude determined from a visual flight rules (VFR) chart.

* * * * *